United States Patent [19]
Wong

[11] Patent Number: 5,894,373
[45] Date of Patent: Apr. 13, 1999

[54] METHOD FOR FABRICATING MIRROR SYSTEMS

[75] Inventor: Jacob Y. Wong, Goleta, Calif.

[73] Assignee: Jaesent Inc., Goleta, Calif.

[21] Appl. No.: 08/937,125

[22] Filed: Sep. 24, 1997

[51] Int. Cl.⁶ .......................... G02B 5/08; G02B 27/08; B23P 13/04; G03C 5/00
[52] U.S. Cl. .......... 359/855; 359/900; 359/616; 29/558; 29/DIG. 3; 29/DIG. 16; 216/24; 216/48; 216/52; 216/100; 430/320; 430/323
[58] Field of Search .................. 359/850, 854, 359/855, 900, 616, 617; 29/17.1, 17.2, 17.8, 896.6, 897, 897.32, 557, 558, DIG. 3, DIG. 16; 216/24, 41, 48, 49, 52, 53, 100; 430/4, 5, 299, 312, 313, 316, 318, 321, 323, 320

[56] References Cited

U.S. PATENT DOCUMENTS

| | | | |
|---|---|---|---|
| 2,452,363 | 10/1948 | Flotron | 359/616 |
| 2,942,768 | 6/1960 | McCall | 29/DIG. 3 |
| 3,111,878 | 11/1963 | Welles et al. | 359/617 |
| 3,860,324 | 1/1975 | Gonzalez | 359/617 |
| 4,215,194 | 7/1980 | Shepherd | 216/52 |
| 4,818,962 | 4/1989 | Molaine | 29/DIG. 16 |
| 5,298,115 | 3/1994 | Leonard | |

*Primary Examiner*—Ricky D. Shafer
*Attorney, Agent, or Firm*—Daniel C. McKown

[57] ABSTRACT

A method for use in mass-producing, from a plane sheet of metal, a three-dimensional structure consisting of plane mirrors and plane structural members, said three-dimensional structure of a type in which each mirror or structural member has at least one edge that is collinear with an edge of another mirror or structural member, whereby said three-dimensional structure can be formed by bending the sheet of metal along various edges, the method including the steps of: producing masks bearing images defining the location of bending grooves, shallow grooves, separation grooves and holes for indexing pins, selecting a mask, applying a coating of photoresist to both sides of the sheet of metal, transferring the images on the selected mask to the coating of photoresist, removing those portions of the coating of photoresist to which the images were transferred, etching the sheet of metal where the portions of the coating of photoresist were removed, removing the remaining photoresist from the sheet of metal, and repeating the process using the next mask until all of the masks have been used. The two-dimensional part thus formed is then bent to form the desired three-dimensional structure, and a layer of a highly reflective material may finally be applied to those portions intended to serve as mirrors.

6 Claims, 6 Drawing Sheets

METHOD FOR FABRICATING MIRROR SYSTEMS

CROSS REFERENCE TO RELATED APPLICATIONS

Not applicable.

STATEMENT RE FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The present invention generally relates to the field of reflective optical systems and, more particularly, to the design and fabrication of mirror systems used for projecting one or more optical images from one location to another, such as in a kaleidoscope.

2. The Prior Art

Reflective optical systems such as those comprising an arrangement of several mirrors for the purpose of projecting one or more images from one location to another are typically constructed using a precise level base plate as the starting structural component. Mirror holders and supports are then precisely laid out on this base plate according to the optical design of the reflective system.

The level of cost and precision for the design and construction for reflective optical systems or mirror systems attainable by such a method is generally directly proportional to the amount of efforts devoted to such tasks. For applications where cost, precision and size are of paramount importance for such reflective optical systems, the general design and construction for them as referred to above are grossly insufficient. The need for an entirely new approach for addressing this problem, taking advantage of concomitantly developed technologies over the past few decades such as the evolution of the so-called "micro-chip" in the semiconductor industry and the like, is apparent.

One interesting and relevant example illustrating this can be found in the kaleidoscope mirror arrangements. There are two basic systems of mirrors in kaleidoscopes: the two-mirror system which produces one central image and the three-mirror which produces images reflected throughout the entire field of view. Both are set up in a triangular configuration in a tube similar to a prism. In the two-mirror system, the two mirrors are arranged in a "V" with the third side of the triangle a blackened, non-reflective surface. The angle of the "V" determines the number of reflections contributing to the overall intricacy of the central pattern. The three-mirror system reacts similarly to the two-mirror system with one major exception. A third mirror replaces the blackened side of the triangle in the two-mirror system and produces a continuation of reflections throughout the entire field of view. Symmetrical images are much harder to achieve in a three-mirror system because now there are three angles which must be accurate instead of only one angle in the two-mirror design. The most common and simplest arrangement for the 3-mirror system is the 60°-60°-60° equilateral triangle. Here each angle produces 6-fold patterns which results in a design of continuous triangles.

Oddly, the construction of the kaleidoscope mirror arrangements, two of the most common ones as described above, has not changed since the invention of this wonderful device by Sir David Brewster in 1816. Mirror systems entail choice of material, dimension, angles and configuration, and they are the soul of the kaleidoscope. However, even though the design for the mirror systems has gone through many changes since the invention of the kaleidoscope, the manner in which the mirror systems are put together remain virtually unchanged.

The first surface mirrors (as versus second surface mirrors for better overall optical quality of the images) are first cut into the correct sizes and then they are manually glued or soldered together along the axial or long edges of the mirrors, with or without the use of a fixture or tooling. In order to achieve just a reasonably acceptable optical precision for such mirror systems, tooling fixtures must be used unless it is being handled by a skillful artisan who has had many years of practice in the art. But even then the optical precision of such mirror systems is very much limited to probably no more than a few thousandths of an inch. For those mirror systems that are put together without tooling fixtures, the optical precision will indeed be very marginal, leading to rather poor or "amateurish" image quality.

The use of manual labor to construct kaleidoscope mirror systems without relying on tooling fixtures generally not only leads to poor optical precision, but also much increased costs due to the amount of time needed for such an assembly. Even with the help of tooling fixtures, the assembly time is not much reduced unless the assembly is automated, which could add significant unwanted capital expenditure. Thus at least from the cost standpoint, there exists a need for an improved methodology for fabricating such mirror systems for kaleidoscopes.

Another major drawback for not attaining high optical precision for such mirror systems, when manual labor without tooling fixtures is used, is the limitation on the size reduction for such systems. For large mirror systems, poor optical precision in their assembly might still lead to acceptable performance from the standpoint of image quality. However, when the size of the mirror systems starts to come down, for example by an order of magnitude, then the same optical imprecision could lead to totally unacceptable image quality. This is another reason why an improved methodology for fabricating such mirror systems is highly desirable.

As mentioned above, the most common mirror systems for kaleidoscopes are the two-mirror and three-mirror systems which comprise basically three optical elements (two mirrors and a non-reflective element for the two-mirror system, and three mirrors for the three-mirror system) set up in a triangular configuration—in a tube similar to a hollow prism. Other more complicated mirror systems are also possible in theory, such as the square, rectangular, and large multiples of mirrors or n-mirror systems, where n is greater than three. Tapered mirrors of three or more sides are also possible. Even combined mirror systems such as two separate but adjoined mirror systems within a kaleidoscope, each with its own eye-piece and view point of the object chamber, are possible. The main reason why these more complicated mirror systems are seldom used and seen in kaleidoscopes is that the currently prevalent manual construction method makes them virtually impossible to construct. It goes without saying that such complicated mirror systems would lead to far more exciting symmetrical image patterns and is therefore highly desirable. Thus there is a need for an improved methodology for fabricating mirror systems for the kaleidoscopes which can handle the construction for more complicated mirror systems.

For the kaleidoscope cited as an example in the present discussion, the mirror system is but one of many components that together make up the kaleidoscope. While kaleidoscopes may vary greatly in appearance and quality, there are four primary elements in any design. They are 1) the eye piece, 2) the body, 3) the mirror system and 4) the object chamber.

In a conventional way of making a kaleidoscope, each of the above elements is individually constructed and then they have to be painstakingly assembled together. Since the mirror system is the soul of the kaleidoscope, it is highly desirable in terms of time and ease of assembly to have it constructed with built-in or integrated features so as to be able to easily accommodate the other three elements in the making of the kaleidoscope. Clearly the manual method of making the mirror system for the kaleidoscope cannot fulfill this desirable feat. Thus there exists a further need for an improved kaleidoscope mirror system fabrication methodology that can provide this desirable feature of overall system integration for the construction of the kaleidoscope.

BRIEF SUMMARY OF THE INVENTION

Accordingly, it is the object of the present invention to provide a novel method of fabricating mirror systems, in particular for kaleidoscopes, capable of achieving extremely high optical precision, flexibility for use in highly complicated, multiple mirror systems without any dimensional constraints, amenity for large volume, low cost production and means for incorporating system integrating features with it in order that an entire kaleidoscope can be assembled with ease and minimum time and efforts.

The present invention is directed to a novel fabrication method for a multi-mirror system such as that used in conjunction with a kaleidoscope.

For example, to fabricate a three-mirror system for a kaleidoscope as discussed earlier, instead of cutting three first surface glass mirrors to their correct sizes according to a particular design, and then manually assembling them into a triangular tube or prism, the present invention fabricates all three mirror blanks simultaneously side by side on a sheet of metal. The three mirror blanks remain joined together along their long sides by grooves that are precisely and chemically etched on the metal surface. The mirrors are then folded together along the grooves to form the triangular tube or prism. The mirrors arc then "locked" together into the permanent triangular tube form by additionally folding specially designed tabs that are fabricated along the edges of the two outer mirrors. Finally, the mirror blanks are then coated with a highly reflective layer and they function as first surface mirrors.

The fabrication of a two-mirror system for a kaleidoscope makes use of the same steps, with the exception that the highly reflective layer is applied to only two of the mirror blanks. The third mirror blank may be etched to produce a dark matte finish.

In summary, the fabrication steps for the present invention begin with a metal sheet (preferably steel) polished on one side to a finish of better than 10 micro-inches. The dimensions of the mirrors together with the folding grooves, shallow tab grooves and separating grooves (parting grooves for different mirror systems) are precisely imprinted onto the metal surface using standard projection photolithographic techniques with the use of proper photoresists and light exposures. The folding grooves and shallow tab grooves, which are shallower than the separating grooves, are chemically etched ahead of the latter. Additional features to the mirror system, such as the eye-piece holder, the object chamber holder and the support and fastening structures for the mirror system to be anchored inside the kaleidoscope body, can be incorporated with the mirror system itself for processing along with the mirror blanks.

As can be seen from the description above, the present invention for the method of fabrication for mirror systems is not limited by size considerations. Furthermore, the present fabrication method can easily accommodate all kinds of mirror arrangements including n-mirror systems, where n>3, square, rectangular, tapered, etc. with equally impressive optical precision.

Further objects and advantages of the invention will be better understood from the following description considered in connection with accompanying drawings in which the preferred embodiments of the invention are illustrated by way of example. It is to be expressly understood, however, that the drawings are for the purpose of illustration and descriptions only and are not intended as a definition of the limits of the invention.

DETAILED DESCRIPTION OF THE PREFERRED EMBODIMENT

It is possible, using the present invention, to fabricate an infinite variety of mirror arrangements, and a relatively simple arrangement has been selected to illustrate the preferred embodiment of the method by which the various structures can be developed.

Figure 1:
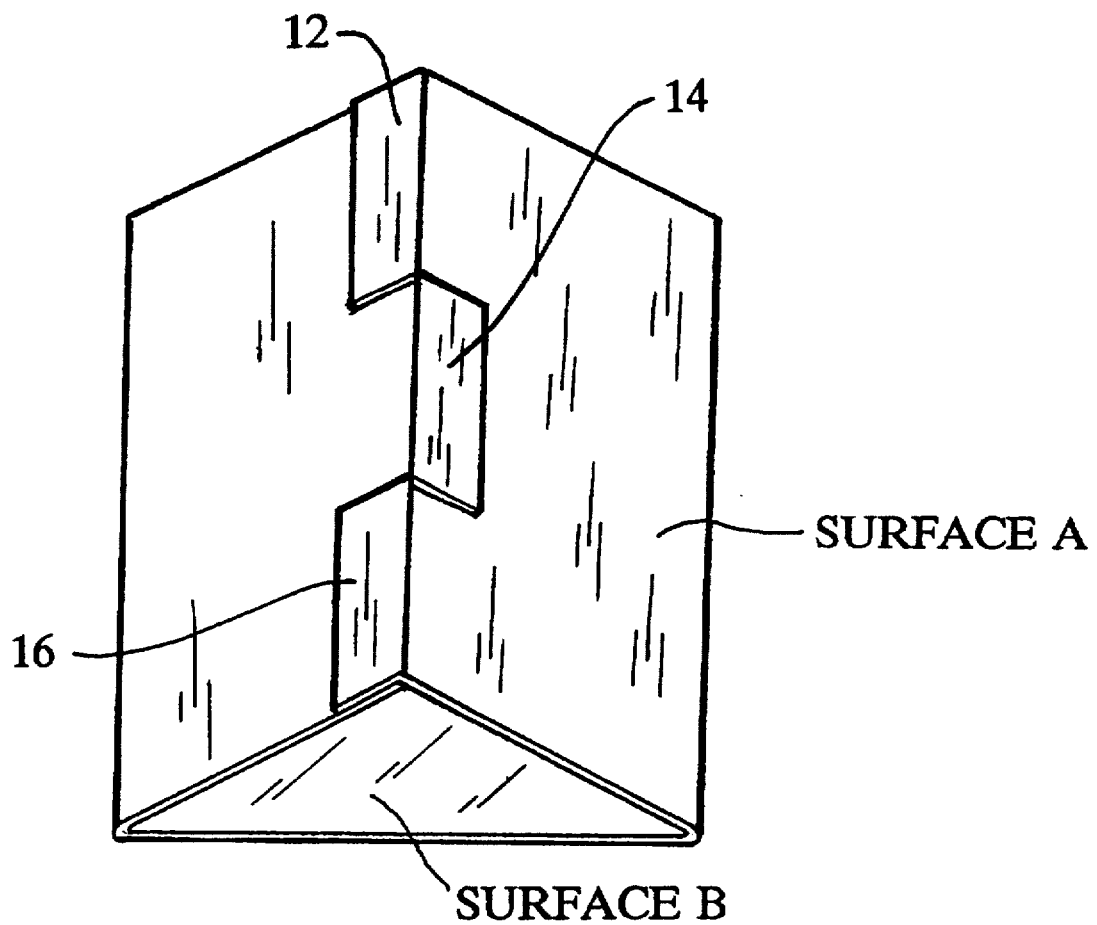
FIG. 1 is a perspective view showing a three-dimensional structure that is developed by application of the method of the present invention in an exemplary preferred embodiment.

FIG. 1 is a top front perspective view showing a mirror system for use in a kaleidoscope. The mirror system consists of three plane rectangular mirrors joined along their longer edges to form a hollow prism, the mirrors facing inward. For simplicity, each of the mirrors is inclined at an angle of 60 degrees with respect to the mirrors adjoining it. To add rigidity, integral flaps 12, 14, and 16 are provided. These flaps serve to demonstrate that structural members can be fabricated by the same process that produces the mirror blanks.

In the preferred embodiment, the structure is composed of cold-rolled steel sheet having a thickness of approximately 0.125 inch. The front and back surfaces of the sheet are ground to a parallelism of better than 0.02 inch per inch. In the present example, the polished surfaces, which will become the mirrors, all lie on one surface of the sheet. This side of the sheet, referred to below as "surface B" is polished to a smoothness of better than 10 micro-inch rms. The other surface, referred to below as "surface A" is polished to a smoothness in the range of 50 to 100 micro-inches rms. Thus, in the present example, the mirror-like interior of the prism-shaped object shown in FIG. 1 is surface B, and the less polished outside of the structure is surface A.

Figure 2:
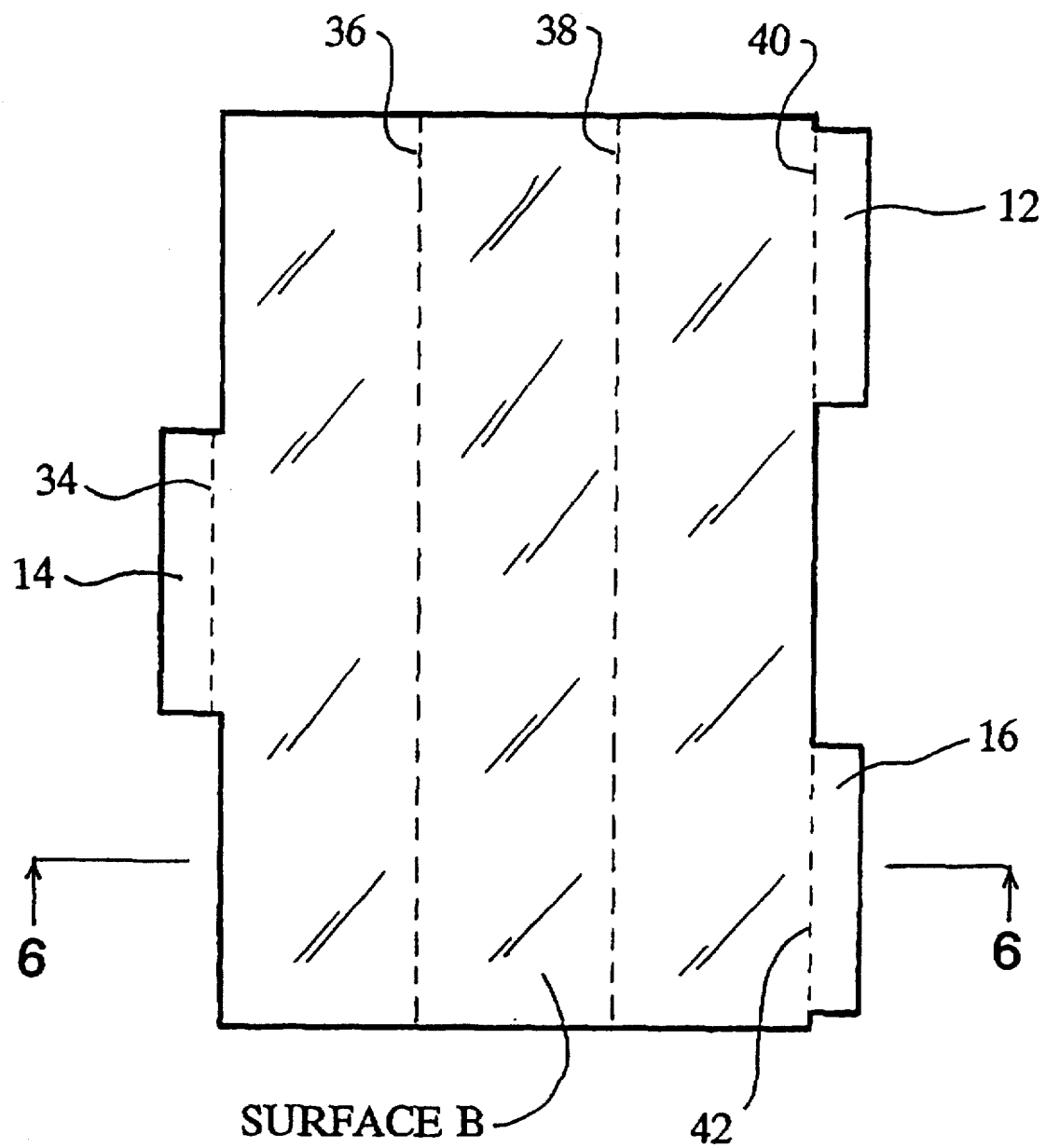
FIG. 2 is a plan view showing the structure of FIG. 1 unfolded.

FIG. 2 is a plan view showing the structure of FIG. 1 in an unfolded condition. The dashed lines in FIG. 2 indicate the bend lines, and in FIG. 2 the polished face, surface B is shown, as indicated by the opaque shading lines.

Figure 6:
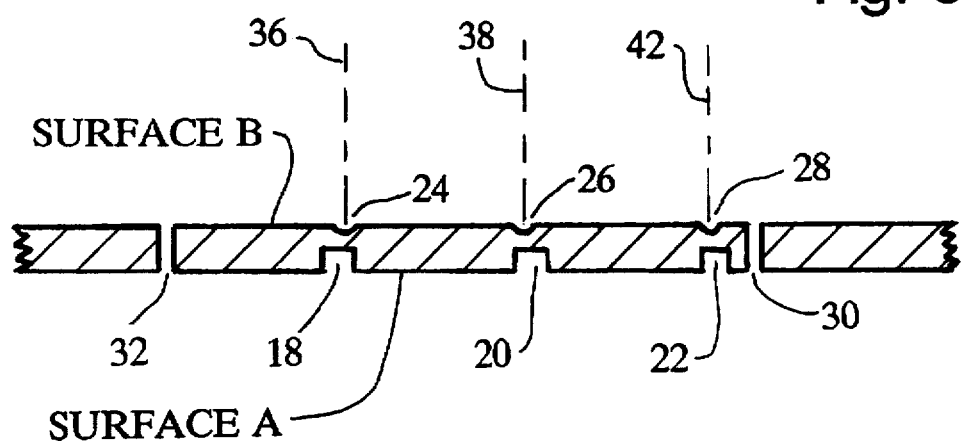
FIG. 6 is a cross sectional elevational view in the direction 6—6 indicated in FIG. 2 showing certain grooves and separations in greater detail; and, FIG. 7 is a cross sectional view showing apparatus for producing a bend.

FIG. 6 is a cross sectional view in the direction 6—6 indicated in FIG. 2. In FIG. 6, the thickness of the material is exaggerated so that the structural features can more clearly be seen. FIG. 6 shows some bending grooves 18, 20 and 22 and some shallow grooves 24, 26 and 28. Also shown are separation grooves 30 and 32, which extend all the way through the material. The purpose of the shallow grooves 24, 26, and 28 is to promote the formation of a sharp bend by removing material from the inside of the bend. The purpose of the bending grooves 18, 20, and 22 is to render the material thinner so that it may be more easily bent. Note that the bending grooves 18, 20 and 22 are not centered on the bend lines 36, 38 and 42, but instead are biased in the direction of the segment to be folded. The purpose of the separation grooves 30 and 32 is to release the mirror structure from the sheet of steel.

Figure 3:
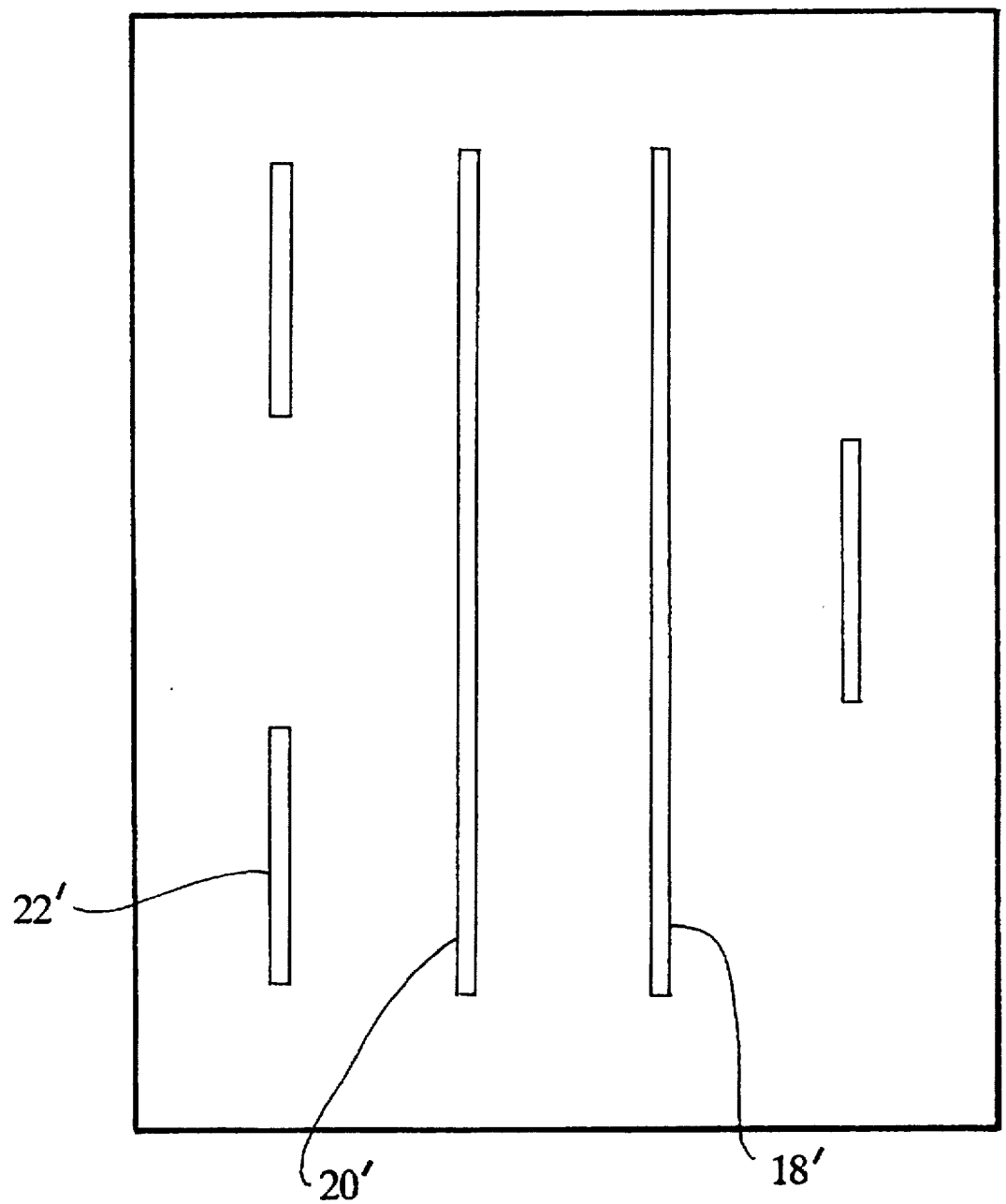
FIG. 3 is a plan view of a mask showing images defining bending grooves to be etched in surface A in the preferred embodiment.
Figure 4:
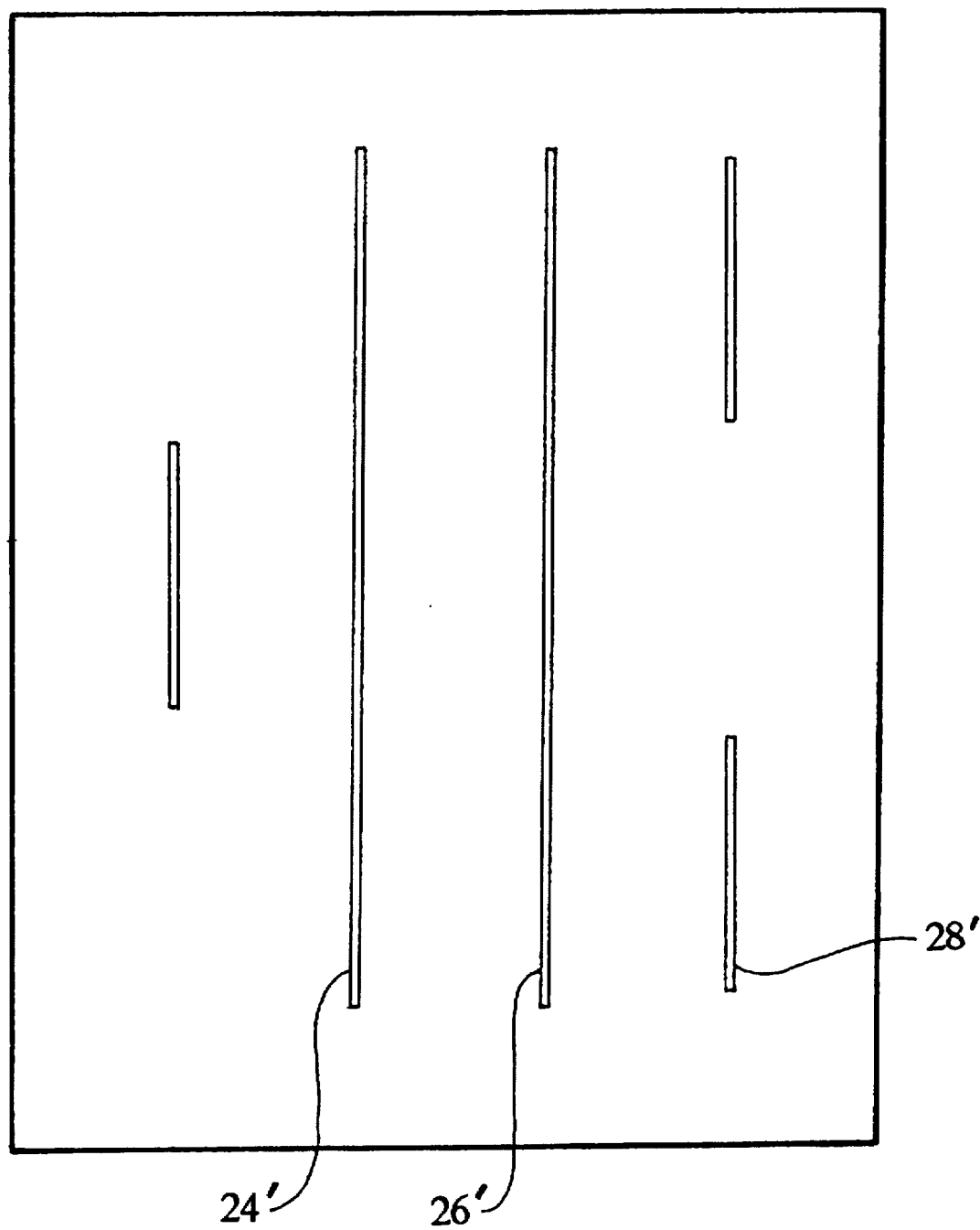
FIG. 4 is a plan view of a mask showing images defining shallow grooves to be etched in surface B in the preferred embodiment.
Figure 5:
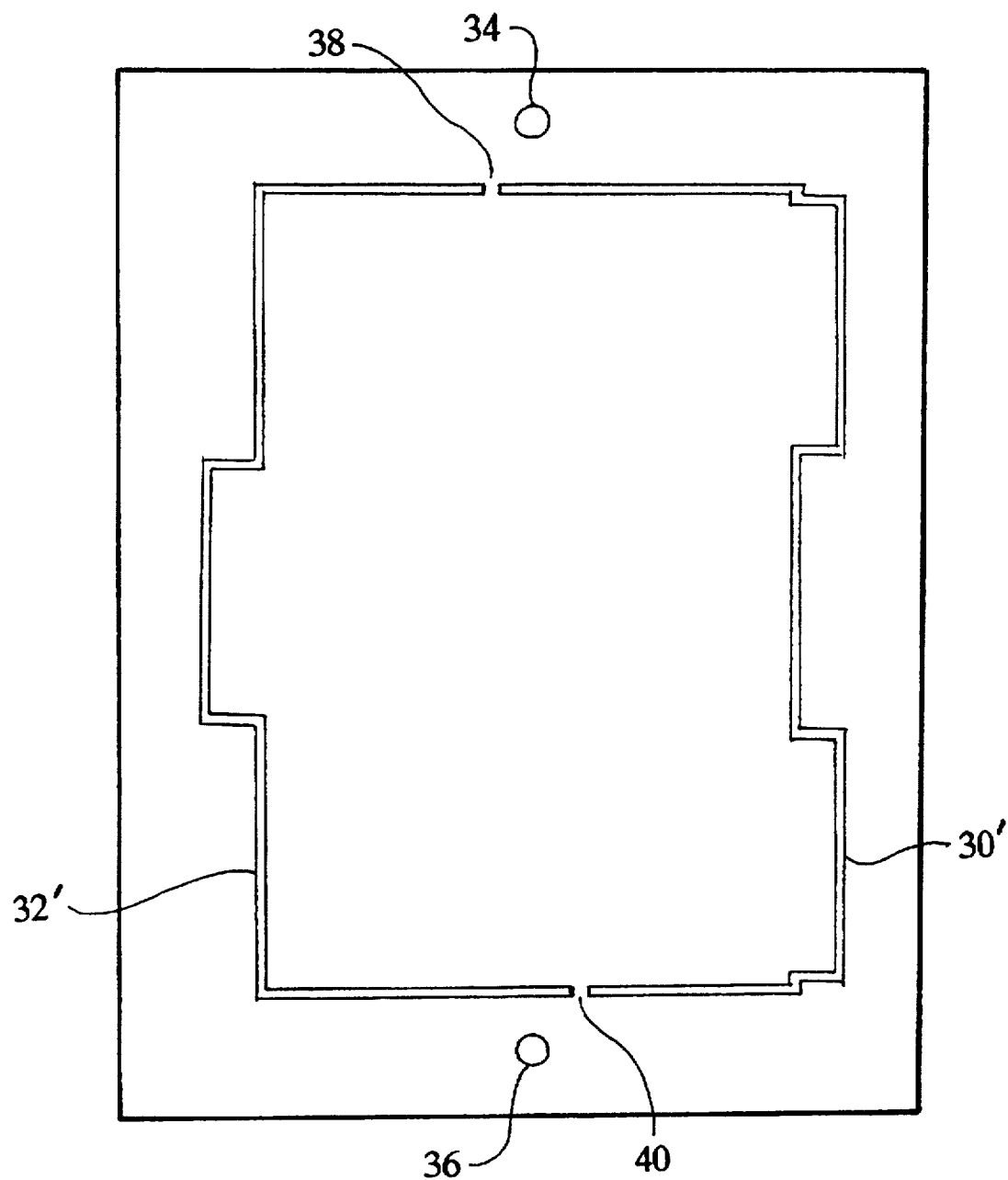
FIG. 5 is a plan view of a mask showing images defining holes and separation grooves to be etched in surface B in the preferred embodiment.

The location and size of the grooves to be etched having been determined, a series of photo masks is made; in the present example, these are shown in FIGS. 3, 4 and 5. The mask of FIG. 3 is for the bending grooves on surface A of the material, whereas the masks of FIGS. 4 and 5 are for the grooves to be made on surface B of the material. Accordingly, in FIG. 3, left and right are reversed relative to the masks shown in FIGS. 4 and 5. The mask of FIG. 3 bears images 18', 20', and 22' corresponding to the bending grooves 18, 20, and 22 of FIG. 6.

The mask of FIG. 4 is used for defining the location of the shallow grooves to be etched in surface B, and the mask of FIG. 4 includes images 24', 26' and 28' corresponding to the shallow grooves 24, 26, and 28 of FIG. 6.

The mask of FIG. 5 bears images defining the location of the separation grooves and images 34 and 36 defining the location of holes for locating pins, the use of which will be discussed below. The mask of FIG. 5 includes the images 30' and 32' corresponding to the separation grooves 30 and 32 of FIG. 6.

After the masks have been prepared, a coating of photoresist is applied to surface A and surface B of the sheet of metal that is to be etched. The next step is to transfer the images from the masks to the photoresist on the appropriate side of the sheet of metal. This can be accomplished in several ways that are known from the field of photolithography. The simplest way corresponds to contact printing, in which the mask is placed in contact with the photoresist and then illuminated with light of an appropriate wavelength; ultraviolet light is required by most photoresists. An alternative technique involves the projection of a real image of the mask onto the photoresist coating. The advantage of this latter technique is that the projected real image may be smaller or larger than the image on the mask.

It can appreciated that larger masks can be designed in which one of the masks shown in FIGS. 3, 4 or 5 can be used as a unit cell that is repeated throughout the larger mask. In this way, a number of mirror structures can be massproduced simultaneously. Another technique is to repeatedly project the images of one of the masks onto the photoresist coating, moving the work piece sufficiently between successive exposures as to prevent overlapping. All of the techniques mentioned above are considered to be within the scope of the present invention and they all have in common the transferring of the images from the selected mask to the coating of photoresist on the appropriate surface of the sheet of metal.

Thus, in accordance with the method of the present invention, one of the masks is selected, and a coating of photoresist is applied to both surfaces of the sheet of metal. Thereafter, the images from the selected masks are transferred to the coating of photoresist on the appropriate surface of the sheet of metal. Next, those portions of the coating of photoresist to which the images were transferred are dissolved from the sheet of metal, but the portions of the coating that were not part of the images remain intact so as to protect the sheet of metal from the etching solution. Thereafter, application of the etching solution produces grooves in the sheet of metal where the images had been transferred.

After the etching has been completed, the remaining photoresist is removed from the sheet of metal. Thereafter another one of the masks is selected, and both surfaces of the sheet of metal are again covered with a coating of photoresist and the process of transferring the images from the second mask, developing the photoresist, etching the sheet of metal, and removing the remaining photoresist are repeated.

In the present example, the images on the mask of FIG. 3 are transferred to surface A of the sheet of metal and the bending grooves are etched. Then the shallow grooves corresponding to the images of the masks of FIG. 4 are transferred to surface B of the sheet of metal and the shallow grooves are etched. Finally, the images on the mask of FIG. 5 are transferred to surface B of the metal and the separation grooves and holes for locating pins are etched.

It is normal and good practice to provide small bridges across the separation groove such as indicated by the gaps 38 and 40 of FIG. 5, to prevent the mirror structure from falling out of the surrounding sheet of metal. These bridges can easily be broken when it is desired to release the mirror structure from the surrounding sheet of metal.

Ordinarily, the etching of the separation grooves is the last etching to be performed, but except for this, the order in which the masks are used is usually not critical.

Although in the present example, all of the mirrored surfaces are produced on surface B, the method of the present invention comprehends arrangements in which some of the mirrored surfaces are on surface B and some are on surface A. The present example also shows that the method of the present invention is not limited to mirror-like surfaces, but may also include non-reflective structural members such as the flaps 12, 14 and 16.

After the two-dimensional pattern for the mirror arrangement has been produced as an intermediate product by the above etching process, two further steps remain: bending the two-dimensional pattern into the desired three-dimensional shape, and applying a thin layer of chrome or gold to those portions that will serve as mirrors, if desired. Normally, the bending step would precede the applying step to avoid the possibility that the mirrored surfaces might be marred by subsequent operations. Although desirable for kaleidoscope mirror systems, the step of applying a thin layer of reflective material may not always be needed; for example, in certain infrared optical systems for use at wavelengths where the reflectivity of the bare steel is adequate.

Tools for bending sheet metal are well-known in the sheet metal trade. The specific tool to be used for making a particular bend depends on the location of the bend in the pattern under consideration. Bending is facilitated by the fact that the material will tend to bend preferentially along the lines established by the shallow-grooves and the bending grooves.

Figure 7:
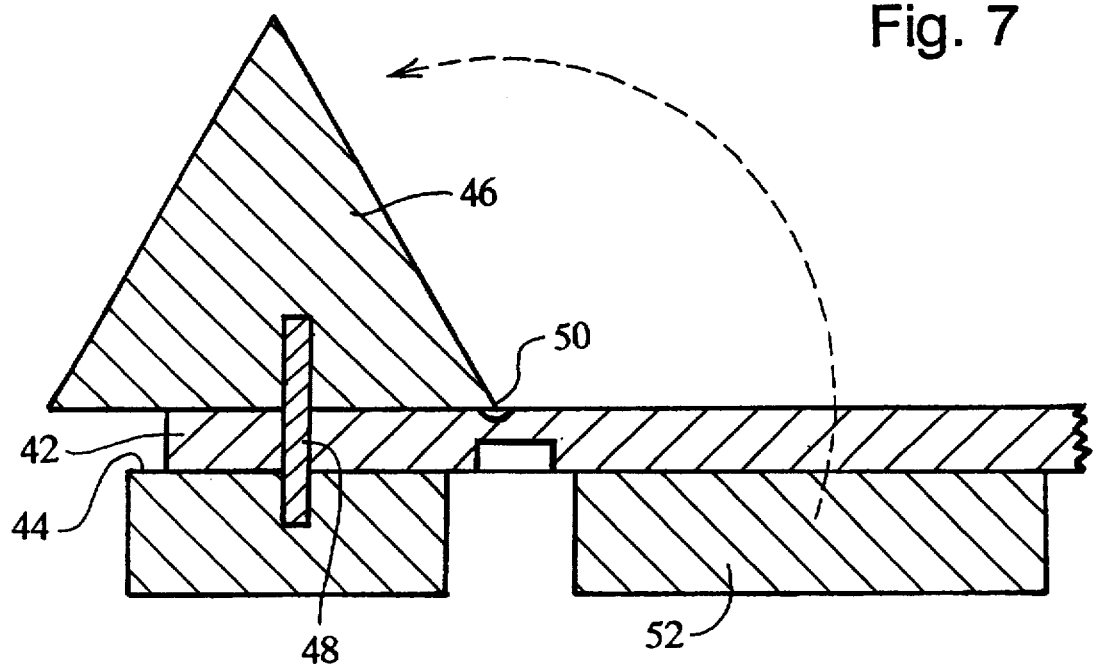

As one example of the tools available for executing the bending step, FIG. 7 shows an apparatus known in the sheet-metal trade as a press brake, for producing accurate and sharp bends in a sheet of material. The material to be bent, in this case the flat metal pattern 42 produced by the etching process, is laid on the bed 44 of the brake and a solid metal prism 46 of appropriate size and angles is pressed down on the pattern 42 and the bed 44. Pins 48 extend through the holes 34 and 36 in the pattern to prevent it from shifting and to accurately locate the pattern 42 with respect to the edge 50 of the prism 46. After the pattern 42 and the prism 46 have been thus secured, a movable portion 52 of the brake is rotated about the edge 50 as indicated by the dashed line in FIG. 7, so as to bend the pattern 42 about the edge 50.

To facilitate making other bends, the pins 48 may be repositioned into different holes in the bed 44. In other embodiments, the pins 48 and the holes 34 and 36 may be dispensed with, the flat metal pattern being held in the vice-like grip of the prism 46 and the bed 44.

Thus, there has been described a method for mass producing three-dimension structures consisting of plane mirrors and plane structural members. The method has been applied to an exemplary structure usable in a kaleidoscope.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A method for use in mass-producing, from a plane sheet of metal, a three-dimensional structure consisting of plane mirrors and plane structural members, wherein each mirror or structural member has at least one edge that is collinear with an edge of another mirror or structural member, whereby said three-dimensional structure can be formed by bending the sheet of metal along various edges, said method comprising the steps of:

a) producing masks bearing images defining the location of shallow grooves to be etched in the sheet of metal for removing metal from the inside of each bend;

b) producing masks bearing images defining the location of bending grooves to be etched in the sheet of metal for removing metal from the outside of each bend;

c) producing a mask bearing images defining the location of holes for locating pins and defining the location of separation etches;

d) selecting one of the masks produced in steps a) through c);

e) applying a coating of photoresist to both surfaces of the sheet of metal;

f) transferring the images from the selected mask to the coating of photoresist on the appropriate surface of the sheet of metal;

g) removing from the sheet of metal those portions of the coating of photoresist to which the images were transferred in step f);

h) etching the sheet of metal where the portions of the coating of photoresist were removed in step g) and nowhere else;

i) removing the remaining photoresist from the sheet of metal without removing any metal; and, j) repeating steps d) through i) until each of the masks has been selected.

2. The method of claim 1 wherein step d) the masks produced in step a) are selected first, then the masks produced in step b) are selected, and finally the mask produced in step c) is selected.

3. The method of claim 1 wherein in step f) the images from the selected mask are transferred repeatedly to predetermined locations on the coating of photoresist, whereby the images are replicated on the coating of photoresist.

4. The method of claim 1 further comprising the subsequent step of bending the sheet of metal by executing steps a) through j) at the shallow grooves to produce the three-dimensional structure.

5. The method of claim 4 further comprising the step of applying a highly reflective layer to those portions of the three-dimensional structure that are to be used as mirrors.

6. The three dimensional structure made by the method of claim 5.

* * * * *